United States Patent
Kodaypak

(10) Patent No.: US 9,954,906 B2
(45) Date of Patent: *Apr. 24, 2018

(54) METHOD AND SYSTEM FOR PROVIDING MEDIA SERVICES IN A COMMUNICATION SYSTEM

(71) Applicant: AT&T Intellectual Property I, LP, Atlanta, GA (US)

(72) Inventor: Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/671,193

(22) Filed: Mar. 27, 2015

(65) Prior Publication Data
US 2016/0285923 A1 Sep. 29, 2016

(51) Int. Cl.
*G06F 15/16* (2006.01)
*H04L 29/06* (2006.01)
*H04L 12/26* (2006.01)

(52) U.S. Cl.
CPC .......... *H04L 65/1069* (2013.01); *H04L 43/08* (2013.01); *H04L 65/103* (2013.01); *H04L 65/1083* (2013.01); *H04L 65/4076* (2013.01)

(58) Field of Classification Search
CPC ... H04L 43/08; H04L 65/103; H04L 65/1069; H04L 65/1083; H04L 65/4076

(Continued)

(56) References Cited

U.S. PATENT DOCUMENTS 6,799,210 B1 * 9/2004 Gentry .................... H04L 29/06
370/352
7,286,545 B1 * 10/2007 Tester ..................... H04L 12/66
370/230

(Continued)

OTHER PUBLICATIONS

Ali et al., Quality of service in 3GPP R12 LTE-advanced, IEEE Communications Magazine, Aug. 2130, pp. 103-109.*

(Continued)

*Primary Examiner* — Moustafa M Meky
*Assistant Examiner* — Thorne E Waugh
(74) *Attorney, Agent, or Firm* — Guntin & Gust, PLC; Douglas Schnabel

(57) ABSTRACT

Aspects of the subject disclosure may include, for example, a method, including receiving from media gateway devices session information that determines communicative couplings between media gateway devices and wireless communication nodes, and detecting a failure of a first media gateway device that provides for transmission of media streams to a first group of wireless communication nodes over a multicast-broadcast single frequency network. The method includes accessing, from the session information, first session information of the first media gateway device, initiating second communicative couplings to the first group of communicative nodes according to the first session information, receiving a unicast stream from a content server that is identified according to the first session information, generating a second multicast stream from the unicast stream, and, in turn, transmitting the second multicast stream over the multicast-broadcast single frequency network to the first group of wireless communication nodes. Other embodiments are disclosed.

20 Claims, 6 Drawing Sheets

(58) Field of Classification Search
USPC .................................................. 709/203–248
See application file for complete search history.

(56) References Cited

U.S. PATENT DOCUMENTS

| | | | |
|---|---|---|---|
| 7,532,568 B1 * | 5/2009 | Boudreaux | H04W 24/04 370/217 |
| 7,738,360 B2 * | 6/2010 | Gillespie | H04L 29/06027 370/216 |
| 7,827,307 B2 * | 11/2010 | Lehrschall | H04L 29/06027 709/224 |
| 7,899,040 B2 * | 3/2011 | Andreasen | H04L 65/1026 370/356 |
| 8,264,956 B2 | 9/2012 | Ramankutty et al. | |
| 8,437,371 B2 | 5/2013 | Wang et al. | |
| 8,509,183 B2 | 8/2013 | Kim et al. | |
| 8,780,782 B2 | 7/2014 | Amerga et al. | |
| 8,797,939 B2 | 8/2014 | Ai | |
| 8,848,514 B2 | 9/2014 | Kompella et al. | |
| 8,849,270 B2 | 9/2014 | Taglienti et al. | |
| 8,855,037 B2 | 10/2014 | Zhai et al. | |
| 8,861,419 B2 | 10/2014 | Korus et al. | |
| 8,908,528 B2 | 12/2014 | Kompella | |
| 8,913,484 B2 | 12/2014 | Kompella | |
| 9,066,153 B2 * | 6/2015 | Pfeffer | H04N 21/64322 |
| 9,351,128 B2 * | 5/2016 | Anchan | H04W 4/06 |
| 2011/0085489 A1 | 4/2011 | Rydnell et al. | |
| 2012/0172028 A1 | 7/2012 | Korus et al. | |
| 2013/0294321 A1 * | 11/2013 | Wang | H04W 4/06 370/312 |
| 2015/0109987 A1 * | 4/2015 | Wang | H04W 12/08 370/312 |
| 2015/0146630 A1 * | 5/2015 | Luo | H04W 16/14 370/329 |

OTHER PUBLICATIONS

Song et al., Relative Time based MBSFN Content synchronization, 2013 Sixth International Workshop on Selected Topics in Mobile and Wireless Computing, 2013 IEEE, pp. 285-290.*

* cited by examiner

METHOD AND SYSTEM FOR PROVIDING MEDIA SERVICES IN A COMMUNICATION SYSTEM

FIELD OF THE DISCLOSURE

The subject disclosure relates to a providing multimedia services in a communication system.

BACKGROUND

Communication systems, such as a mobile communications system, can be used for providing various services, including voice, video and/or data services, and user location information can be important for next generation IP multi-media services provided by telecommunication systems. As the number of users and their service requirements increase, the load on the network increases. Infrastructure expansion and improvement can lessen the network load but are costly.

BRIEF DESCRIPTION OF THE DRAWINGS

Reference will now be made to the accompanying drawings, which are not necessarily drawn to scale, and wherein.

DETAILED DESCRIPTION

Figure 1:
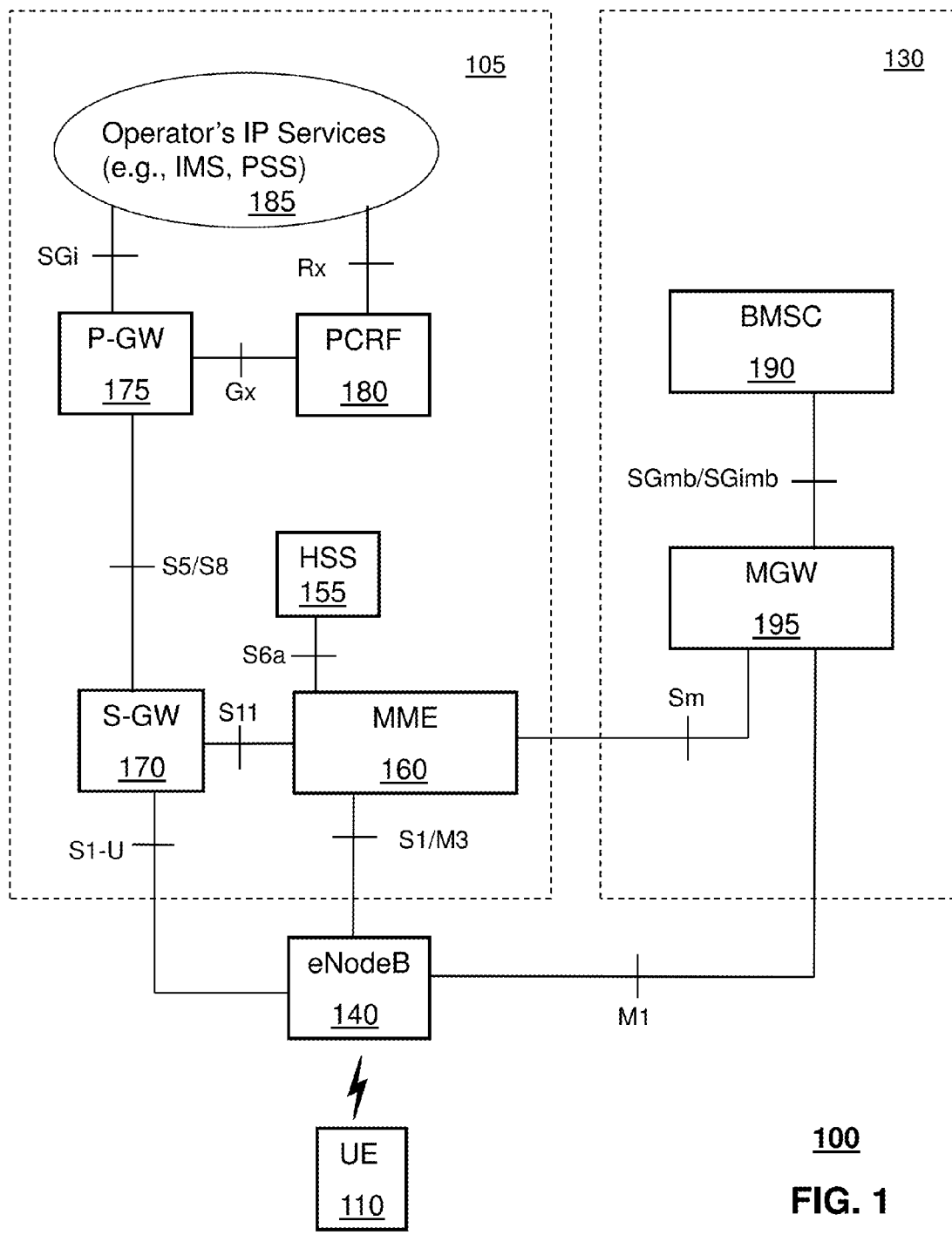
FIG. 1 depicts an illustrative embodiment of a mobile communication system for providing media services to mobile devices.

The subject disclosure describes, among other things, illustrative embodiments for providing reliable media services in an LTE cellular communication system. Other embodiments are described in the subject disclosure.

One or more aspects of the subject disclosure include a reliable multicast broadcast multimedia services (MBMS) network serving a long-term evolution (LTE) mobile communication system. The MBMS network can provide a system and method for providing media services to wireless communication nodes using a multicast-broadcast single frequency network. The MBMS network can utilize a distributed network of media gateway (MGW) devices to communicatively couple broadcast multicast service center (BMSC) media content servers to wireless communication nodes using, for example, bearer pathways and multicast group IP addresses. A backup MGW device can receive session information from primary MGW devices in the distributed network of MGW devices. The session information can include data used by the primary MGW devices to initiate communicative couplings, such as bearer pathways and multicast groups, and can included for identifying a content server of the BMSC. The backup MGW device can monitor operational states of the primary MGW devices in the MBMS network to detect primary MGW devices that are failing or otherwise exhibiting a loss of operational performance. The backup MGW device can automatically take over for a failing primary MGW device, while using the session information from the failing primary MGW device to initiate communicative couplings that reproduce the bearer paths and multicast groups of the failing primary MGW device. The backup MGW device can receive unicast media streams from a BMSC media server and can deliver broadcast multicast media streams to the wireless communication nodes using the reproduced bearer paths and multicast groups.

One embodiment of the subject disclosure includes a device, including a processor and a memory that stores executable instructions that, when executed by the processor, facilitate performance of operations, can include receiving, from a media gateway device, session information for first communicative couplings between the media gateway device and a group of wireless communication nodes. The first communicative couplings can provide for transmission of a first media stream from a content server over a multicast-broadcast single frequency network, and the first media stream can be generated from a first unicast stream received at the media gateway device from the content server. The operations can also include determining an operational state of the media gateway device indicating a loss of operational performance. The operations can further include, in response to the loss of operational performance, directing the media gateway device to interrupt the first communicative couplings, and, in turn, initiating second communicative couplings to the group of wireless communication nodes according to the session information. The operations can further include identifying the content server according to the session information, receiving a second unicast stream from the content server, and generating a second media stream from the second unicast stream, where the content of the first media stream and the second media stream is the same. In turn, the operations can also include transmitting the second media stream over the multicast-broadcast single frequency network to the group of wireless communication nodes to enable distribution to a group of end user devices.

One embodiment of the subject disclosure includes machine-readable storage medium, including executable instructions that, when executed by a processor, facilitate performance of operations, including monitoring operational states of media gateway devices that provide communicative couplings between the media gateway devices and wireless communication nodes for transmission of media streams to the wireless communication nodes over a multicast-broadcast single frequency network. The operations can also include determining, from the operational states of the media gateway devices, a loss of operational performance of a first media gateway device, and, in turn, accessing first session information that describes first communicative couplings of the first media gateway device and a first group of wireless communication nodes for transmission of a first media stream over the multicast-broadcast single frequency network to the first group of wireless communication nodes responsive to the determination of the loss of performance. The operations can further include initiating second communicative couplings to the first group of wireless communication nodes according to the first session information, and, in turn, transmitting a second media stream over the multicast-broadcast single frequency network to the first group of wireless communication nodes to enable distribution to a group of end user devices.

One embodiment of the subject disclosure includes a method, including receiving, by a system comprising a processor, session information from media gateway devices, wherein the session information determines communicative couplings between media gateway devices and wireless communication nodes. The method can include detecting, by the system, a failure of a first media gateway device that provides for transmission of media streams to a first group of wireless communication nodes over a multicast-broadcast single frequency network, accessing, from the session information, first session information of the first media gateway device, and initiating, second communicative couplings to the first group of communicative nodes according to the first session information. The method can include receiving, by the system, a unicast stream from a content server that is identified according to the first session information, generating a second multicast stream from the unicast stream, and, in turn, transmitting the second multicast stream over the multicast-broadcast single frequency network to the first group of wireless communication nodes to enable distribution to a group of end user devices.

FIG. 1 depicts an illustrative embodiment of a mobile communication system 100. The mobile communication system 100 that is illustrated that can provide communication services, including voice, video and/or data services to mobile devices, such as mobile communication device, or end user device 110. System 100 can enable communication services over a number of different networks, such as between end user device 110 and another communication device (e.g., a second end user device) not shown. End user device 110 can be a number of different types of devices that are capable of voice, video and/or data communications, including a mobile device (e.g., a smartphone), a personal computer, a set top box, and so forth.

In one or more embodiments, the mobile communication system 100 can include one or more Evolved Nodes, or eNodeB nodes 140 which can also enable connectivity between end user devices 110 and the core network 105. The eNodeB nodes 140 can enable carrying many traffic types including real-time circuit-switched to IP-based packet switched traffic. The eNodeB 140 can utilize a number of interfaces including Iu, Uu, Iub and/or Iur. In one or more embodiments, eNodeB nodes 140 can support the air interface for an LTE path for mobile networks according to a 3GPP specification. The eNodeB nodes 140 on the network can be connected to each other such as via X2 interfaces and which are further connectable to the packet-switched, core network 105 via an S1 interface. In various embodiments, the end user device 110 can wirelessly connect to the mobile communications system 100 using, for example, a Long-Term Evolution (LTE) Radio Access Technology (RAT) network, such as E-UTRAN, or a Universal Mobile Telecommunications System (UMTS), a Global System for Communications (GSM) network, Evolution Data Only (EVDO) network, or a Code Division Multiple Access (CDMA) network. In one or more embodiments, an end-user device 110 can be wirelessly connected to the eNodeB node 140 via radio access technology (RAT). For example, the end user devices 110 can be served by an Evolved Universal Terrestrial Radio Access Network (E-UTRAN).

In one or more embodiments, a Mobile Management Entity (MME) 160 can perform the function of a control-node. For example, the MME 160 can perform functions such as idle mode tracking and paging procedure including retransmissions. The MME 160 can also choose a serving gateway for the end user device 110 such as at the initial attach and at time of intra-LTE handover involving node relocation.

In one or more embodiments, a Home Subscriber Server (HSS) 155 can be provided that is a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments, a Serving Gateway (S-GW) 170 can route and forward user data packets for voice and data, while also acting as the mobility anchor for the user plane during inter-eNodeB handovers and as the anchor for mobility between LTE and other 3GPP technologies (e.g., terminating S4 interface and relaying the traffic between 2G/3G systems and P-GW 175). For idle state UEs 110, the S-GW 170 can terminate the downlink data path and can trigger paging when downlink data arrives for the UE 110. The S-GW 170 can manage and can store UE 110 bearer path contexts, such as parameters of the IP bearer service, network internal routing information, for voice, text, and data operations.

In one or more embodiments, a PDN Gateway (P-GW) 175 can provide connectivity from the UE 110 to external packet data networks by being the point of exit and entry of traffic for the UE 110. UE 110 can have simultaneous connectivity with more than one P-GW 175 for accessing multiple PDNs. The P-GW 175 can perform policy enforcement, packet filtering for each user, charging support, lawful interception and/or packet screening. The P-GW 175 can also act as the anchor for mobility between 3GPP and non-3GPP technologies such as WiMAX and 3GPP2 (CDMA 1x and EvDO).

The system 100 can further include a Mobility Management Entity (MME) 160. Other components not shown can also be utilized for providing communication services to the UE 110, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, a Policy Control Resource Function (PCRF) 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network.

In one or more embodiments, a Broadcast Multicast Service Center (BMSC) network 130 is coupled to the core network 105. The BMSC network 130 can provide multicast broadcast multimedia services (MBMS) to user devices 110. The BMSC network 130 can transmit media content over a multicast-broadcast single frequency network. Multimedia broadcasting, such as network television, cable programs, and/or sporting events, can be broadcast over the mobile communication system 100 using multicasting. The use of multicasting can provide the bandwidth and system efficiencies that are achieved by broadcasting via cable, satellite, and (to a lessor extend) the Internet. MBMS technology can provide live content, as well as popular file download delivery, to users of mobile communication devices 110 over an LTE mobile communication system 100.

In one or more embodiments, the MBMS network 130 can include one or more broadcast multicast service centers (BMSC) 190, or content servers 190, and one or more media gateway (MGW) devices 195, or media gateways 195. The content servers 190 can be capable of selecting, access, and/or receiving media content. The content servers 190 can receive media content from data networks, content source providers (e.g., television networks or production companies, or sporting leagues), satellite feeds, and/or cable networks. The MBMS network 130 can direct a content server 190 to select a particular media content item or set of media content items for broadcast to user devices 110 via the mobile communication network 100.

In one or more embodiments, the MBMS network 130 can include one or more media gateways 195. Each media gateway 195 manages data paths for transmission of media from a content server 190 to one or more end user devices 110. In one embodiment, a media gateway 195 can initiate multicast groups, which can allow end user devices 110 to receive multicast content at eNodeB nodes 140. The MGW 195 can associate each multicast group under its control with unique Internet Protocol (IP) addresses and can offer access to broadcast content that is associated with the multicast group to the end user devices 110 via one or more eNodeB nodes 140. In one embodiment, end user devices 110 can join an offered multicast group by sending a session initiation protocol (SIP) JOIN message to the offering media gateway 195.

In one or more embodiments, the media gateway 195 can manage the initiation and maintenance of bearer paths for transmitting broadcast data to the user devices 110. In one or more embodiments, the media gateways 195 can initiate MBMS sessions with bearer path contexts that are associated with each end user device 100 that has joined each multicast group. The bearer path allows the end user device 110 to receive multicast broadcast data from the MBMS network 130. The media gateway 195 can stores MBMS session attributes for each bearer context. When a bear path has been initiated, the MGW 195 can initiate tunnels for user data traffic to particular eNodeB nodes 140 that are service particular end user devices 110 in a serving area.

In one or more embodiments, the content server 190 can transmit media content to one or more media gateways 195 as a unicast data stream. In one example, the content server 190 can transmit a direct, unicast stream for each broadcast item to each media gateway 195. In one or more embodiments, the media gateway 195 can generate a multicast data stream from the received unicast data stream. The media gateway 195 can transmit the multicast data stream via the bearer path and the multicast IP address. End user devices 110 that are members of the multicast group for the broadcast media can receive the multicast data stream from the eNodeB 140 using the multicast IP address.

Figure 2:
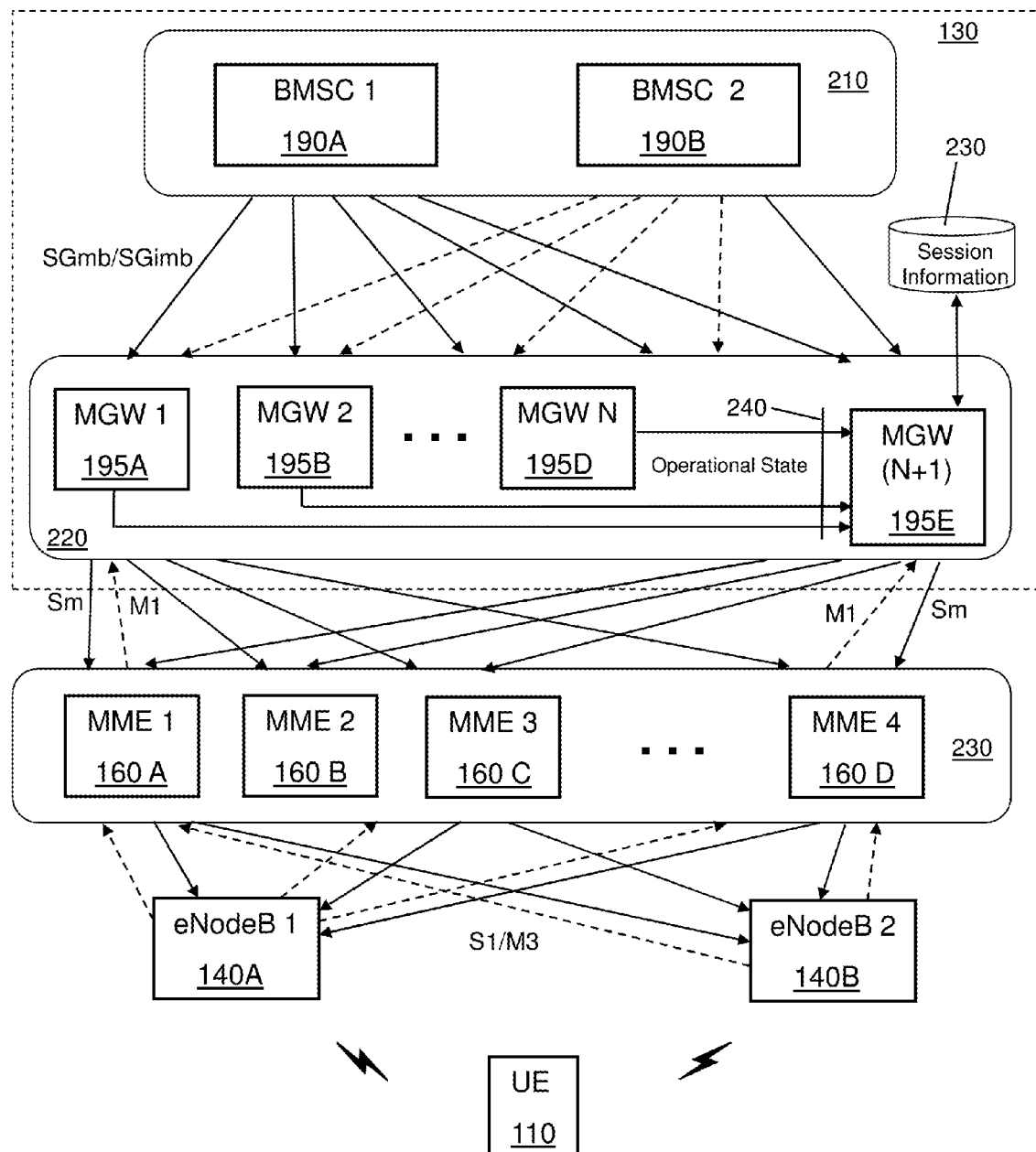
FIG. 2 depicts an illustrative embodiment of a network architecture for proving media services with reliable media gateway capability in the mobile communication system.

FIG. 2 depicts an illustrative embodiment of a network architecture for proving multicast broadcast media services with reliable media gateway capability in the mobile communication system 100. In one or more embodiments, an MBMS communication network 200 can include a broadcast multicast service center (BMSC) group 210, a media gateway (MGW) group 220, a mobility management entity (MME) group 230, eNodeB wireless communication nodes 140A-B, and wireless user equipment 110. The BMSC group 210 can include a group of content servers 190A-B that can provide broadcast media content to the use equipment 110 via the MBMS communication network 200.

In one or more embodiments, the MBMS communication network 200 can include a pool of MGW devices 220 that are deployed in a distributed architecture (i.e., not centralized) in data centers spread across a geographic region that is served by an LTE broadcast service area. In one embodiment, an LTE broadcast service area can be coincident with a geographic region. A series of BMSC groups 210 can, for example, be spread across an LTE broadcast service area to provide multicast-broadcast content to user equipment devices 110 in the broadcast service area.

In one or more embodiments, a BMSC content server 190A can initiate a multicast-broadcast session by sending messages with session attributes to the one or more media gateway devices 195A-D of the media gateway group 220 to indicate that a multicast-broadcast session is scheduled and available. In one or more embodiments, media gateway devices 195A-D can respond to the notification message by creating communication paths for the multicast-broadcast of the media content to reach user equipment devices 110 via wireless communication nodes eNodeB 140A-B. To accomplish this, one or more of the media gateway devices 195A-D can initiate a transport network layer connectivity for the multicast-broadcast media content by creating bearer paths and by allocating multicast group IP addresses.

In one or more embodiments, a single media gateway device 195A, which can be called a primary media gateway device 195A, is assigned to serve the multicast-broadcast content to one or more eNodeB nodes 140A-B for wireless access by user equipment devices 110. The primary media gateway device 195A can initiate one or more multicast groups that are associated with the multicast-broadcast content at the eNodeB nodes 140A-B. The primary media gateway device 195A can allocate one or more multicast group IP addresses for the multicast groups that are associated with transporting the multicast-broadcast content. The primary gateway device 195A can create one or more bearer pathway contexts for transporting the multicast-broadcast content to the eNodeB nodes 140A-B. In one or more embodiments, the primary gateway device 195A can store the MBMS session information, the bearer pathway context information, and the multicast IP address information that is used to initiate and support the transport network layer connectivity between the one or more BMSC content servers 190A-B and the one or more eNodeB wireless nodes 140A-B.

In one or more embodiments, once the MBMS sessions are established by the primary media gateway device 195A, the one or more eNodeB wireless nodes 140A-B can send group "JOIN" messages to the media gateway device 195A. For example, an eNodeB wireless node 140A can send an Internet group management protocol (IMGP) or multicast listen discovery "JOIN" request to allow one or more user equipment devices 110 to join a multicast group that the has been created for the multicast-broadcast of the content. If the join request is accepted by the primary media gateway device 195A, then the transport network layer connectivity is established by the primary media gateway device 195A for transmitting multicast-broadcast media content from the BMSC content server 190A to one or more user devices 110 via the LTE single frequency network. The primary media gateway device 195A can tunnels user data traffic to an eNodeB wireless node that is serving the user equipment device 110.

In one or more embodiments, a listing of available multicast media content can be made available to user equipment devices 110 by the BMSC server 190A. For example, an electronic programming guide (EPG), an Internet accessible website, or a client application running at the user equipment device 110 can display one or more multicast-broadcast media content items that are available from the MBMS system 130. The user equipment device 110 can select an available multicast-broadcast media content item.

In one or more embodiments, the MBMS system 200 can be used to provide multicast-broadcast content over a signal frequency, LTE network. Traditional multimedia broadcasting content (e.g., network television, cable programs, sporting events) can be broadcast over a cellular LTE network with the same effect as such content is broadcast, today, over cable, satellite, and/or the Internet. The MBMS system 200 can provide live multicast-broadcast video and multimedia content, as well as popular file download delivery, to users of user equipment mobile communication devices 110 over an LTE-based cellular system.

Reliable and superior service delivery can be important for attracting customers, retaining customers, and/or reducing customer churn. There are several shortcomings in the current design that can be overcome with this invention. In one or more embodiments, the MBMS system 200 can increase reliability and service quality by providing MBMS session redundancy and flexibility. The MBMS system 200 can enhance service reliability and capability by providing a geo-redundant media device gateway network 220 that can maintain MBMS bearer contexts, session information, and multicast group data in the event of a failure of any primary media gateway device 195A in the media device gateway network 220.

In one or more embodiments, the MBMS system 200 provides geo-redundancy for MBMS bearer contexts within the media device gateway network 220 while maintaining an efficiently deployed design. Geo-redundancy can allow the MBMS system 200 to continue providing broadcast-multicast content service in the face of geographically local disruptions to service (e.g., local power outages, fires, storms).

In one or more embodiments, The media gateway device network 195 can be made up of a group of media gateway devices 195A-D that can be deployed in a distributed architecture (not centralized) in data centers spread across a geographic region that is served by an LTE broadcast service area. In one embodiment, the LTE broadcast service area can be coincident with a geographic region. In one embodiment, a series of LTE data centers can be spread across the LTE broadcast service area to initiate and support transport network layer connectivity to serve user equipment mobile devices 110 in the broadcast service area.

In one or more embodiments, a BMSC content server 190A can transmit broadcast content to a primary media gateway device 195A as a unicast data stream. In one embodiment, the BMSC content server 190A can send unicast data streams for multiple broadcast content items to each media gateway device 195A and/or can send unicast data streams to multiple media gateway devices 195A-D. In one or more embodiments, the BMSC content server 190A can provide session context information to the media gateway devices 195A-D.

In one or more embodiments, the media gateway device 195A can generate a multicast data stream from the unicast data stream that is received from the BMSC content server 190A. The media gateway device 195A can associated streaming data with a multicast IP address and a multicast group. The multicast IP address can be supplied by the media gateway device 195A to every eNodeB node 140A-B which has joined a multicast group for receiving the multicast stream.

In one or more embodiments, all of the eNodeB nodes 140A-B that are connected to a primary media gateway device 195A via one or more mobile management entities 160A-D can send "JOIN" messages to the primary media gateway device 195A to join a multicast group. For example, an eNodeB wireless node 140A can use an S1/M3 link to initiate multicasting broadcasting reception for one or more user equipment devices 110 that are coupled to the MBMS network 200 via the eNodeB node 110.

The primary media gateway device 195A can encounter a reduced operation state. For example, the primary media gateway device 195A can fail, enter a reduced operating state, encounter a network access issue, and/or enter a reset state. As a result, the primary media gateway device 195A can exhibit a reduced capacity (or no capacity) for initiating or sustaining transport network layer connectivity and/or reduced capacity (or no capacity) for receiving the unicast data stream from the BMSC content server, generating a multicast data stream from the unicast data stream, and/or transmitting the multicast data stream to the eNodeB nodes 140A-B. In the reduced capacity state, the primary media gateway device 195A can lack sufficient capacity or capability to serve the unicast data stream to the eNodeB devices 140A-B and, in turn, to serve the user equipment devices 110.

In one or more embodiments, the group of media gateway devices 220 can include a secondary media gateway device 195E. The secondary media gateway device 195E can be co-located with the group of media gateway devices 220 or can be housed in a different location to provide geo-redundancy. In one embodiment, the secondary media gateway device 195E can serve as a backup to one or more of the other media gateway devices 195A-D in the group 220. For example, the secondary media gateway device 195E can take over for a media gateway device 195B that fails. The secondary media gateway device 195E can assume the functions of sustaining bearer pathways and providing multicast data streams for one or more eNodeB nodes 140A-B in providing multicast-broadcast media content to user equipment devices 110 in the event of the failure of the media gateway device 195B. In one embodiment, the secondary media gateway device 195E can assume a portion of the multimedia-broadcast traffic for one or more of the media gateway devices 195A-D of the group 220 in the event of reduced performance of one or more of the media gateway devices 195A-D and/or in the event of excessive loading of the media gateway device network 220.

In one or more embodiments, the secondary media gateway device 195E can receive MBMS session information from the media gateway devices 195A-D of the media gateway device group 220. The MBMS session information can include bearer path context information detailing the user data bearer paths that have been initiated by each of the media gateway devices 195A-D for transporting multicast-broadcast media content to the eNodeB nodes 140A-B. The MBMS session information can include multicast group information that associates eNodeB nodes 140A-B with the media gateway devices 195A-D for transporting of particular items of media content and that associates the multicast-broadcast media content with multicast IP addresses. The MBMS session information can include multicast group joining information. The MBMS session information can include identification information for BMSC content servers 190A-B that transmit data streams of multicast-broadcast content to the media gateway devices 195A-D. In one or more embodiments, the MBMS session information that is provided to the secondary media gateway device 195E can facilitate an efficient and seamless takeover by the secondary media gateway device 195E of the multicast-broadcast duties of one or more of the primary media gateway devices 195A-D in the event of a failure or loss of performance.

In one or more embodiments, the MBMS session information of the primary media gateway devices 195A-D of the media gateway group 220 can be shared with the second media gateway device 195E by storing the MBMS session information in a MBMS session information server database 230. For example, each of the primary media gateway devices 195A-D can periodically report their current MBMS session information to the MBMS session information server database 230. In another example, the primary media gateway devices 195A-D can report their current MBMS session information to the MBMS session information server database 230 any time the MBMS session information changes. For example, the MBMS session information at the MBMS session information server database 230 can be updated when a new MBMS session is initiated or an existing MBMS ends and/or when a new eNodeB node 140B is added or subtracted from a multicast group. In one embodiment, the secondary media gateway device 195E can request the MBMS session information from the primary media gateway devices 195A-D of the media gateway group 220 on a periodic basis and store the results in the MBMS session information server database 230. In one embodiment, the MBMS session information server database 230 can request the MBMS session information from the primary media gateway devices 195A-D of the media gateway group 220 on a periodic basis and store the results in the MBMS session information server database 230.

In one or more embodiments, the secondary media gateway device 195E can receive operational state information 240 from the primary media gateway devices 195A-D of the media gateway group 220. The operational state information 240 can be in the form of a "heartbeat" message that is transmitted between the primary media gateway devices 195A-D and the secondary media gateway device 195E. The secondary media gateway device 195E can determine from the heartbeat message whether a primary media gateway device 195A is in a normal operating state or has stopped/failed. The secondary media gateway device 195E can determine if the primary media gateway device 195A has entered a reduced operational state mode. In one embodiment, the heartbeat message can include a report of operational parameters to provide detailed operational information about the primary media gateway device 195A. For example, the heartbeat message can include operational loading information for the primary media gateway device 195A. The secondary media gateway device 195E can determine, based on the operational loading information, whether the primary media gateway device 195A is operating at or below full capacity. The secondary media gateway device 195E can determine whether to offload all or part of the current multicast-broadcast transport loading from the primary media gateway device 195A to the secondary media gateway device 195E.

In one or more embodiments, the operational state of the primary media gateway devices can be uploaded to the secondary media gateway device 195E on a periodic basis or can be uploaded based on an event. For example, the operational state can be reported (or interpreted from) every heartbeat message. In another example, the operational state can be uploaded to the secondary media gateway device 195E upon the occurrence of an operational state altering event, such as when an MBMS session begins or ends. In another example, the operational state can be uploaded to the secondary media gateway device 195E whenever the primary media gateway device crosses an operational threshold, such as a traffic limit, a warning state, or a quality of service (QoS) threshold.

In one or more embodiments, the secondary media gateway device 195E can determine, based on the reported operational state information from all of the media gateway devices 195A-D in the media gateway device group 195E, that primary media gateway device 195B is exhibiting a reduced operational performance or has operationally failed. The secondary media gateway device 195E can access the current MBMS session information for primary media gateway device 195B from the MBMS session information server database 230. The secondary media gateway device 195E can use the current MBMS session information for primary media gateway device 195B to replicate the network transport layer that primary media gateway device 195B is currently providing with a substitute network transport layer that is provided by the secondary media gateway device 195E. In one or more embodiments, the replicated network transport layer can include the communicative couplings necessary for the secondary media gateway device 195E to take over for the failed primary media gateway device 195B, including bearer pathways, multicast groups, and multicast IP addressing. In one or more embodiments, the secondary media gateway device 195E can use the current MBMS session information to identify one or more BMSC content servers 190A-B of the BMSC server group 210 that are providing the media content to the failed primary media gateway device 195B. The secondary media gateway device 195E can request and receive unicasted data streams of the media from the BMSC content servers 190A-B and can generate multicast data streams to replace those lost due to the failed primary media gateway device 195B. In one or more embodiments, the secondary media gateway device 195E can transport replacement multicast data streams to the eNodeB nodes 140A-B over the replacement network transport layer to efficiently and seamlessly replace the function of the failed primary media gateway device 195B. In one embodiment, the secondary media gateway device 195E can direct the failed primary media gateway device 195B to terminate its network transport layer and to cease generation of its multicast media content.

In one or more embodiments, the secondary media gateway device 195E can determine, based on the reported operational state information from all of the media gateway devices 195A-D in the media gateway device group 195E, that primary media gateway device 195B is operating normally but is overloaded or is operating with reduced operational capability. The secondary media gateway device 195E can determine to offload a portion of the multicast traffic from the primary media gateway device 195B to preserve the reliable operation of the MBMS system 200. In one or more embodiments, secondary media gateway device 195E can access the current MBMS session information for primary media gateway device 195B from the MBMS session information server database 230. The secondary media gateway device 195E can use the current MBMS session information for primary media gateway device 195B to replicate a portion of the network transport layer that primary media gateway device 195B is currently providing with a substitute network transport layer that is provided by the secondary media gateway device 195E. In one or more embodiments, the replicated network transport layer can include the communicative couplings necessary for the secondary media gateway device 195E to take over a portion of the multicast responsibilities of the underperforming/over-utilized primary media gateway device 195B, including bearer pathways, multicast groups, and multicast IP addressing. In one or more embodiments, the secondary media gateway device 195E can use the current MBMS session information to identify one or more BMSC content servers 190A-B of the BMSC server group 210 that are providing the media content to the underperforming/over-utilized primary media gateway device 195B. The secondary media gateway device 195E can request and receive unicasted data streams of the media from the BMSC content servers 190A-B and can generate multicast data streams to replace those lost due to the underperforming/over-utilized primary media gateway device 195B. In one or more embodiments, the secondary media gateway device 195E can transport replacement multicast data streams to the eNodeB nodes 140A-B over the replacement network transport layer to efficiently and seamlessly replace the function of the underperforming/over-utilized primary media gateway device 195B. In one embodiment, the secondary media gateway device 195E can direct the underperforming/over-utilized primary media gateway device 195B to terminate a portion of its network transport layer and to cease generation of a portion of its multicast media content.

In one or more embodiments, the secondary media gateway device 195E can continue to receive operational state information for a failed and/or underperforming/over-utilized primary media gateway device 195B after the secondary media gateway device 195E has taken over all or part of the multicast transport functions for the primary media gateway device 195B. In one or more embodiments, the secondary media gateway device 195E can determine, based on the operational information that the failed and/or underperforming/over-utilized primary media gateway device 195B has returned to a normal operational state. The secondary media gateway device 195E can direct the restored primary media gateway device 195B to resume providing transport services for the multicast-broadcast content and eNodeB nodes 140A-B for which the secondary media gateway device 195E has provide replacement services. The restored primary media gateway device 195B can access the stored MBMS session information to recover the bearer pathway, multicasting, and BMSC content server information necessary to re-initiate the communicative coupling and the multicast data stream that the primary media gateway device 195B was serving prior to the loss operational capability.

Figure 3:
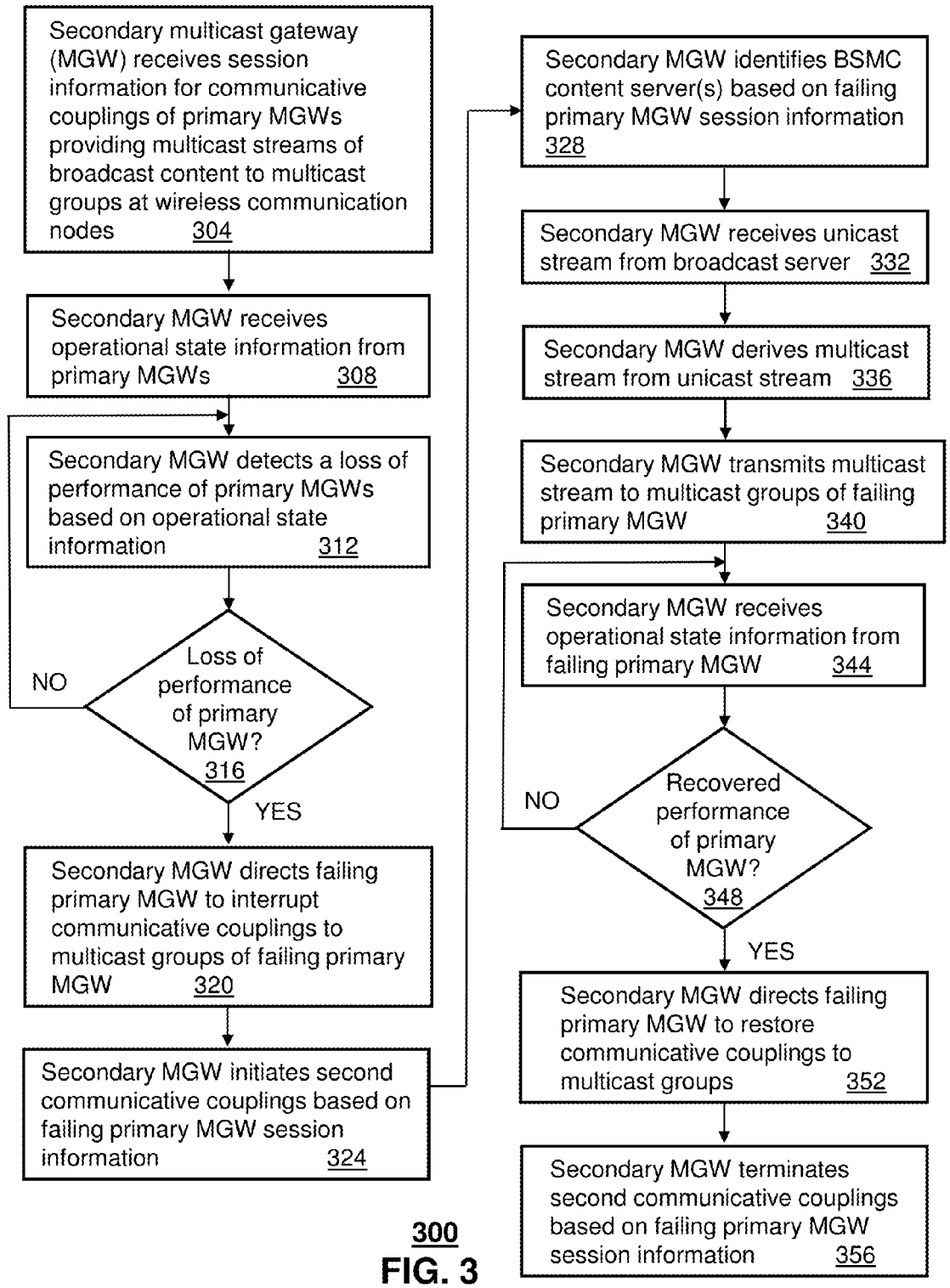
FIG. 3 depicts an illustrative embodiment of a method for providing reliable media services in the mobile communication system.

FIG. 3 depicts an illustrative embodiment of a method used by the communication systems of FIGS. 1-2. In one or more embodiments, the method includes step 304, where a secondary media gateway device can receive MBMS session information for communicative couplings of primary media gateway devices that provide multicast streams of broadcast content to multicast groups at wireless communication nodes.

In one or more embodiments, in step 308, the secondary media gateway device can receive operational state information from primary media gateway devices. In step 312, the secondary media gateway device can detect a loss of performance of primary media gateway devices based on operational state information. If, in step 316, no loss of performance of the primary media gateway devices is detected, then the secondary media gateway device continues monitoring the performance of the primary media gateway devices.

If, in step 316, the secondary media gateway device detects a loss of performance in one of the primary media gateway devices, then, in step 320, the secondary media gateway device can direct the failing and/or underperforming/over-utilized primary media gateway device to interrupt communicative couplings to multicast groups of the primary media gateway device. In step 324, the secondary media gateway device can initiate second communicative couplings based MBMS session information of the primary media gateway device. In step 328, the secondary media gateway device can identify one or more BMSC content server for broadcast content based on the primary media gateway device session information.

In step 332, the secondary media gateway device can receive a unicast data stream for the content from the BMSC content server. In step 336, the secondary media gateway device can generate a multicast data stream from the unicast data stream and, in turn, transmit the multicast stream to multicast groups of the primary media gateway device, in step 340. In step 344, the secondary media gateway device can receive operational information from the primary media gateway device, whose function has been replaced by the secondary media gateway device. In step 348, the secondary media gateway device can determine from the operational state information of the primary media gateway device that the primary media gateway device has not recovered performance. The secondary media gateway device can continue to monitor the operation performance of the primary media gateway device in step 344.

If, in step 348, the secondary media gateway device determines that the primary media gateway device has recovered its operational performance, then, in step 352, the secondary media gateway device can direct the primary media gateway device to restore communicative couplings to the multicast groups that were formerly served by the primary media gateway device prior to replacement. In step 356, the secondary media gateway device can terminate the second communicative couplings for the replacement network transport layer.

Figure 4:
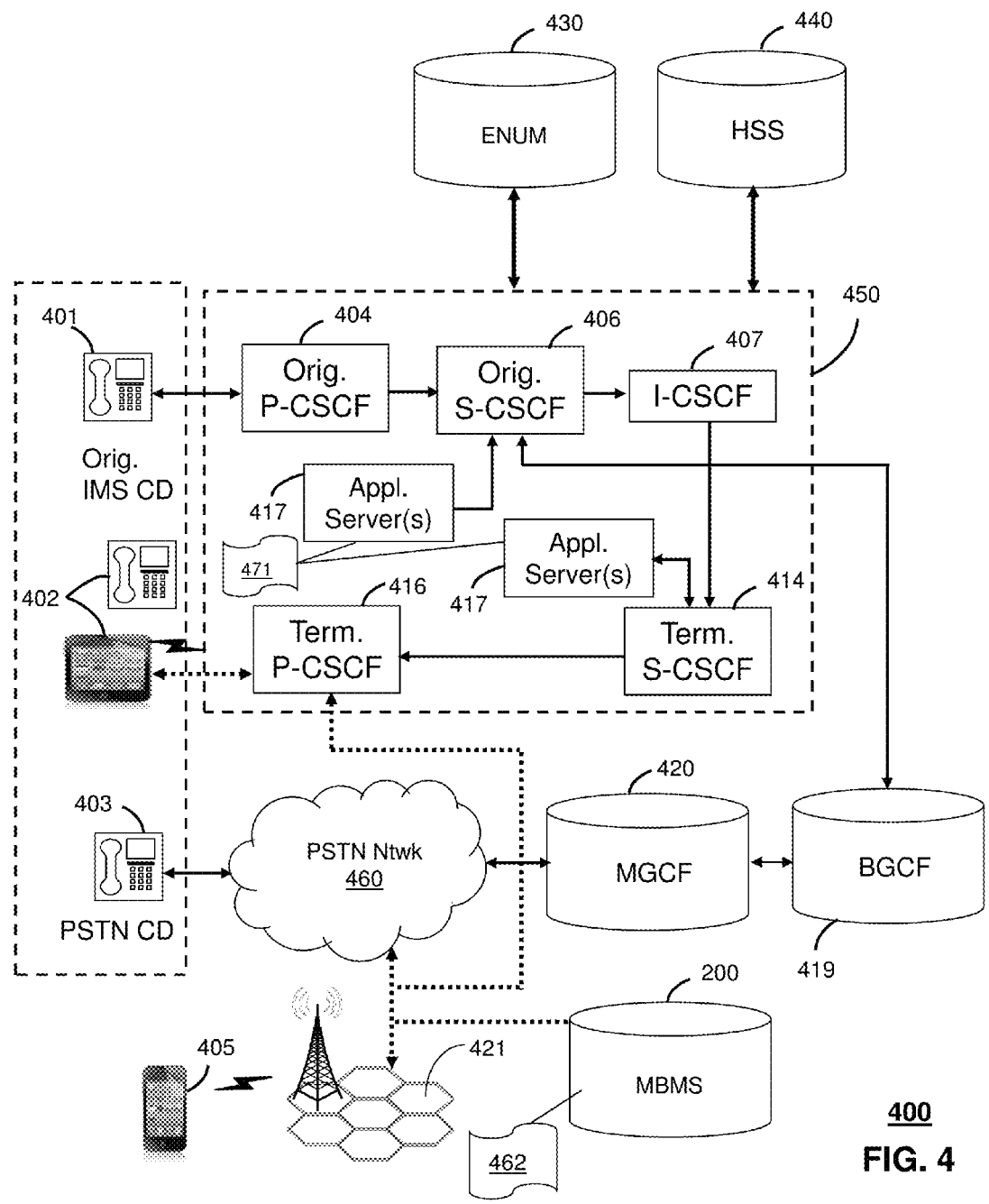
FIG. 4 depicts illustrative embodiments of a communication system that provide media services according to the systems and methods of FIGS. 1-3.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with communication systems 100-200 of FIGS. 1-2 and communication system 400 as another representative embodiment of communication system 400. A MBMS system 200 can provide multicast-broadcast content to communication devise 405 over a single-frequency, LTE-based network using cellular base stations 421. The MBMS system 200 can utilize a network 220 of media gateway devices to provide network transport layer services between a network 210 of BMSC content servers and a network of eNodeB nodes 140A-B. A secondary media gateway device 195E can monitor operational states of primary media gateway devices 195A-D of the media gateway device network 220 to determine if any of the primary media gateway devices is failing, underperforming, and/or over-utilized. If a problematic primary media gateway device 195A is identified, then the secondary media gateway device 195E can access MBMS session information for all of the primary media gateway devices 195A-D at a MBMS session information server database 230. The secondary media gateway device 195E can replicate communicative couplings that are used by the problematic primary media gateway device 195B to provide a replicated network transport layer for using the secondary media gateway device 195E. The secondary media gateway device 195E can identify and access a BMSC content server to receive unicasted data streams of the content that is being served to multicast groups by the problematic primary media gateway device 195B. The secondary media gateway device 195E can generate replacement multicast data streams and transport these multicast data streams to the multicast groups according to the MBMS session information.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The MBMS network 200 of FIGS. 1-2 can be operably coupled to communication system 400 for purposes similar to those described above. The MBMS network 200 can perform function 462 and thereby provide reliable multicast-broadcast services to the CDs 401, 402, 403 and 405 of FIG. 4, similar to the functions described for the MBMS network 200 of FIG. 2 in accordance with method 300 of FIG. 3. Application servers 417 can perform function 417, which can be substantially similar to function 462 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
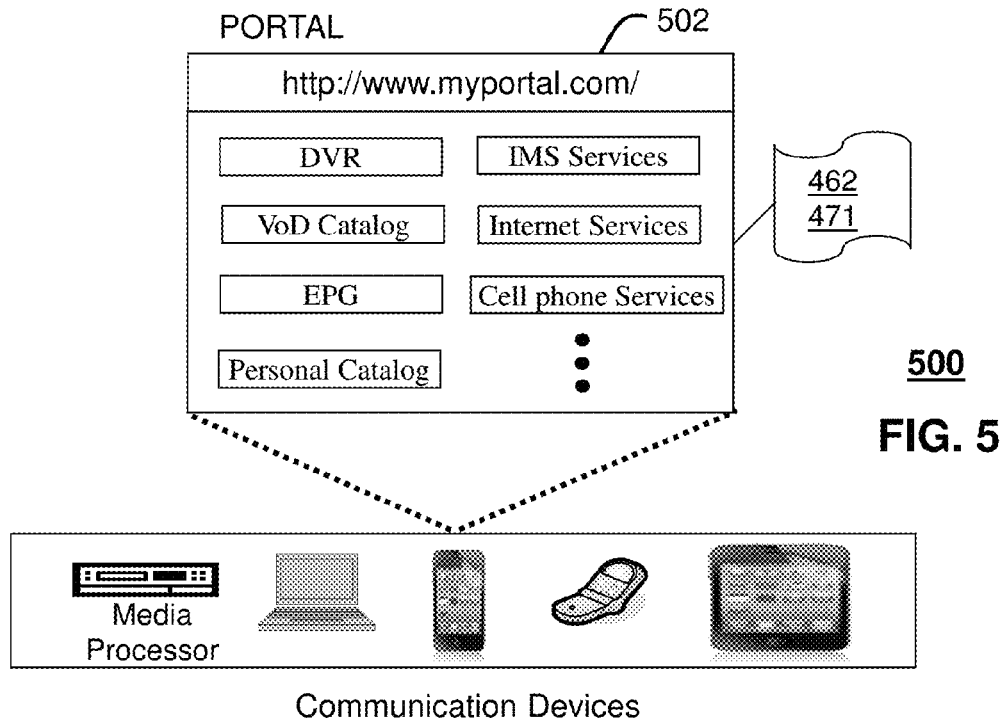
FIG. 5 depicts an illustrative embodiment of a web portal for interacting with the communication systems of FIGS. 1-2, and 5.

FIG. 5 depicts an illustrative embodiment of a web portal 502 of a communication system 500. Communication system 500 can be overlaid or operably coupled with systems 100 and 200 of FIGS. 1 and/or 2, and communication system 400 of FIG. 4, as another representative embodiment of systems 100 and 200 of FIGS. 1 and/or 2, communication system 400, and/or communication system 500. The web portal 502 can be used for managing services of systems 100 and 200 of FIGS. 1 and/or 2 and communication system 400. A web page of the web portal 502 can be accessed by a Uniform Resource Locator (URL) with an Internet browser using an Internet-capable communication device such as those described in FIGS. 1 and/or 2 and FIGS. 4-5. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462 and 471 to adapt these applications as may be desired by subscribers and/or service providers of systems 100 and 200 of FIGS. 1 and/or 2, and communication system 400. For instance, users of the services provided by the MBMS system 200 can log into their on-line accounts and provision a server within the MBMS system 200 with a user profile or provide contact information to a server to enable it to communication with devices described in FIGS. 1-4, and so on. Service providers can log onto an administrator account to provision, monitor and/or maintain the systems 100 and 200 of FIGS. 1 and/or 2.

Figure 6:
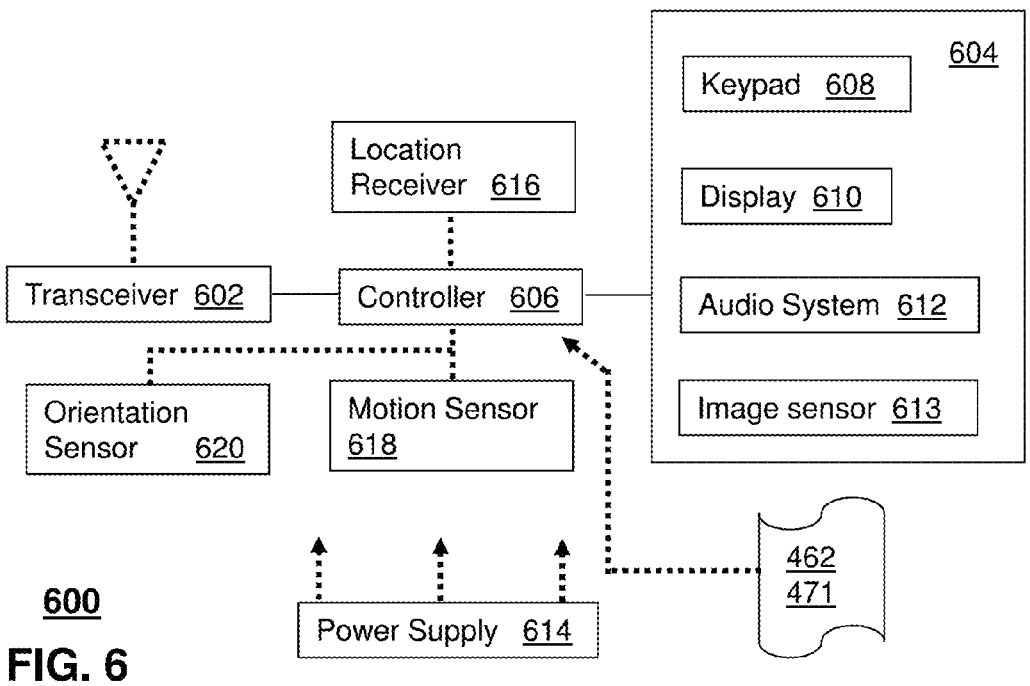
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1 and/or 2, and FIGS. 4-5 and can be configured to perform portions of method 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIGS. 1 and/or 2, such as the user equipment devices 110 of FIGS. 1 and 2, as well as the IMS CDs 401-402 and PSTN CDs 403-405 of FIG. 4. It will be appreciated that the communication device 600 can also represent other devices that can operate in systems 100 and 200 of FIGS. 1 and/or 2, communication system 400 of FIG. 4. In addition, the controller 606 can be adapted in various embodiments to perform the functions 462 and 471, respectively.

Upon reviewing the aforementioned embodiments, it would be evident to an artisan with ordinary skill in the art that said embodiments can be modified, reduced, or enhanced without departing from the scope of the claims described below. For example, after a primary media gateway device fails over to the secondary media gateway device, the primary media gateway device can recover via a self-healing process, such as a reset or a system clear. The primary media gateway device can recover according to a system-level diagnostic and/or via intervention of a system technician. In one or more embodiments, a recovered primary media gateway device can enter a standby mode, during which its operational state is made known to the secondary media gateway device. In one embodiment, the recovered primary media gateway device can stay in a standby mode until a new multicast-broadcast from a BMSC content server begins. Then the recovered primary media gateway device can initiate communication couplings to enable the new multicast-broadcast to proceed, while the secondary media gateway devices services in-process multicast-broadcast sessions that were transferred from the primary media gateway device at the time of loss of operational performance. In this way, a failed primary media gateway device can slowing come back on line, thus providing a level of hysteresis for trouble-shooting performance.

In one or more additional embodiments, the primary media gateway device group can be deployed in a distributed manner over a number of data centers to serve a given LTE broadcast area. In one embodiment, the distributed group of primary media gateway devices can be backed up by a single secondary media gateway device. In one embodiment, the distributed group of primary media gateway devices can be backed up by a series of secondary media gateway devices, where each data center has a dedicated secondary media gateway device.

In one or more additional embodiments, the secondary media gateway device can take on the workload of multiple primary media gateway devices. In one embodiment, the primary media gateway devices and the secondary media gateway device can communicate via a high speed data link. For example, a Diamond protocol link can be used.

In one or more additional embodiments, after a primary media gateway device has been replaced by a secondary media gateway device, the primary media gateway device can become the new "secondary" media gateway device. That is, the secondary media gateway device can be any of the media gateway devices in the group and can be reassigned. The new secondary media gateway device can access the MBMS session information and the operational state information of the other primary media gateway devices—including the former secondary media gateway device.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
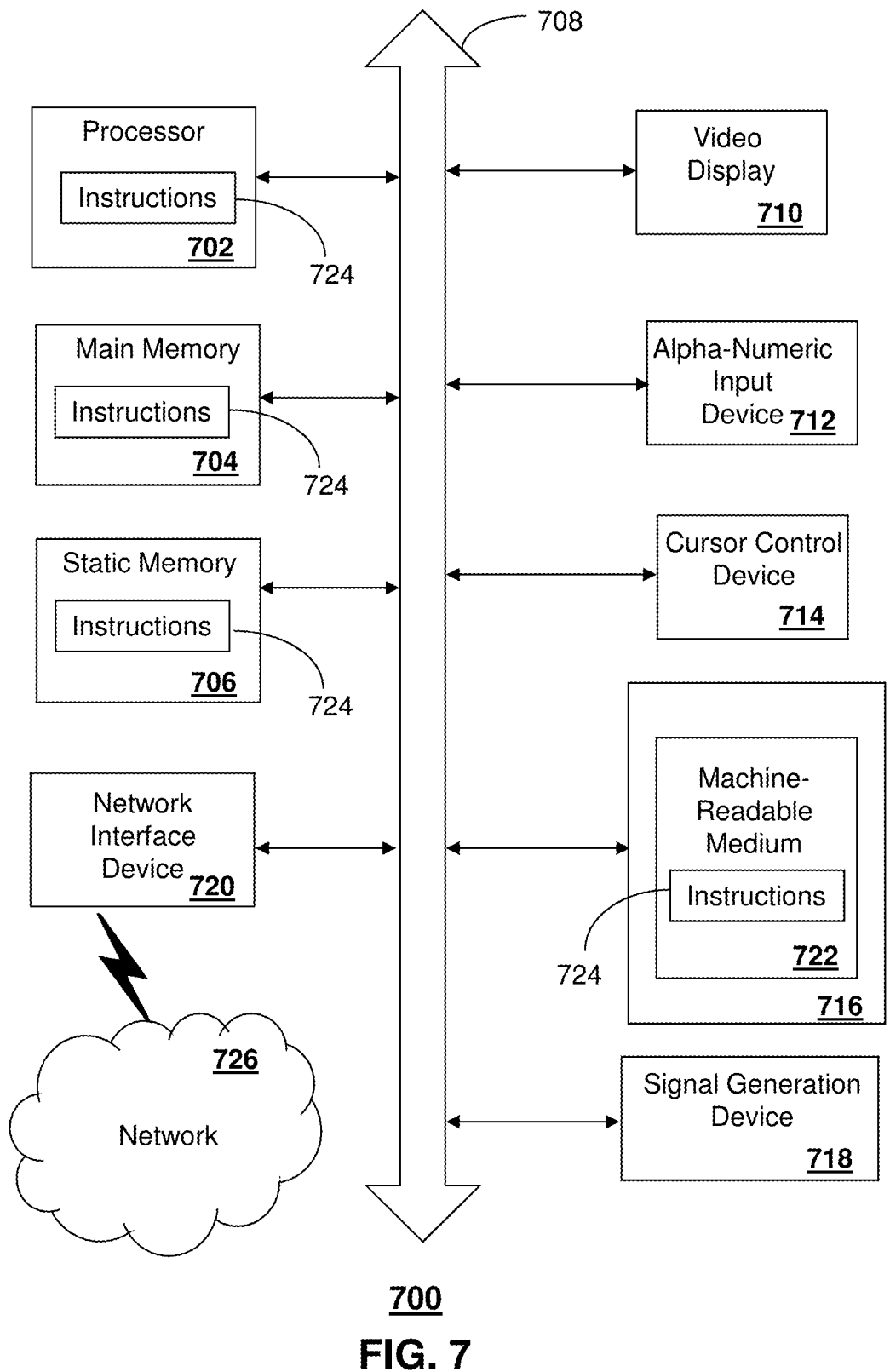
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as elements of the MBMS system 200, the user equipment devices 110, and/or the MBMS session information server 230 as illustrated in FIGS. 1 and 2. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving, from a media gateway device, session information associated with first communicative couplings between the media gateway device and a group of wireless communication nodes, the first communicative couplings providing for transmission of a first media stream to the group of wireless communication nodes from a content server over a multicast-broadcast single frequency network, the first media stream being generated from a first unicast stream received at the media gateway device from the content server;
determining an operational state of the media gateway device indicating reduced operational performance of the media gateway device; and
responsive to a determination of the reduced operational performance of the media gateway device, substituting for the media gateway device by:
directing the media gateway device to interrupt the first communicative couplings to the group of wireless communication nodes;
initiating second communicative couplings to the group of wireless communication nodes according to the session information associated with the first communicative couplings between the media gateway device and the group of wireless communication nodes;
identifying the content server according to the session information;
receiving a second unicast stream from the content server;
generating a second media stream from the second unicast stream, wherein content of the first media stream and the second media stream is the same; and
transmitting the second media stream over the multicast-broadcast single frequency network to the group of wireless communication nodes to facilitate distribution to a group of end user devices.

2. The device of claim 1, wherein the determining of the operational state is according to a heartbeat message that is periodically received from the media gateway device.

3. The device of claim 2, wherein the operations further comprise:

determining a second operational state of the media gateway device indicating a recovery of operational performance of the media gateway device;

directing the media gateway device to resume the first communicative couplings for resumption of transmission of the first media stream over the multicast-broadcast single frequency network responsive to the recovery of operational performance; and terminating the transmitting of the second media stream the resumption of transmission by the media gateway device.

4. The device of claim 1, wherein the operations further comprise:

receiving, from a second media gateway device, second session information that is associated with third communicative couplings between the second media gateway device and a second group of wireless communication nodes for providing for transmission of a second media stream from a second content server over the multicast-broadcast single frequency network;

receiving a second operational state for the second media gateway device indicating a second reduced operational performance;

responsive to the second reduced operational performance:

initiating fourth communicative couplings to the second group of wireless communication nodes according to the second session information;

identifying the second content server according to the second session information;

generating a third media stream from a second unicast stream that is received from the second content server; and transmitting the third media stream to the second group of wireless communication nodes according to the fourth communicative couplings.

5. The device of claim 1, wherein the session information comprises bearer path contexts and a multicast group internet protocol address associated with the transmission of the first media stream to the group of wireless communication nodes over the multicast-broadcast single frequency network.

6. The device of claim 1, wherein the session information is received from the media gateway device when the media gateway device initiates a multicast group associated with the group of wireless communication nodes.

7. The device of claim 1, wherein the session information is received from the media gateway device responsive to the media gateway device detecting the operational state.

8. The device of claim 1, wherein the media gateway device transmits the session information to a server comprising a database for storing a plurality of session information from a plurality of media gateway devices, and wherein the operations further comprise receiving of the session information by accessing the session information from the server.

9. The device of claim 1, wherein the operations further comprise determining the reduced operational performance at the media gateway device according to the operational state that is received.

10. The device of claim 1, wherein the determining of the operational state of the media gateway device comprises detecting an absence of a heartbeat signal from the media gateway device.

11. The device of claim 1, wherein the reduced operational performance comprises one of reaching a utilization threshold, encountering a warning state, reaching a quality of service threshold, or any combinations thereof.

12. The device of claim 1, wherein the operations further comprise:

requesting the operational state from the media gateway device; and analyzing the operational state to determine the reduced operational performance.

13. The device of claim 1, wherein the device and the media gateway device are co-located at a data center for providing multicasting services to a plurality of wireless communication nodes.

14. The device of claim 1, wherein the device and first media gateway device are in two different geographic locations.

15. A non-transitory machine-readable storage medium, comprising executable instructions that, when executed by a processing system including a processor, facilitate performance of operations, comprising:

monitoring operational states of media gateway devices that provide communicative couplings between the media gateway devices and wireless communication nodes for transmission of media streams to the wireless communication nodes over a multicast-broadcast single frequency network;

determining, from the operational states of the media gateway devices, a reduced operational performance of a first media gateway device;

responsive to determination of the reduced operational performance of the first media gateway device, substituting for the first media gateway device by:

accessing first session information that describes first communicative couplings of the first media gateway device and a first group of wireless communication nodes for transmission of a first media stream over the multicast-broadcast single frequency network to the first group of wireless communication nodes;

initiating second communicative couplings to the first group of wireless communication nodes according to the first session information; and transmitting a second media stream over the multicast-broadcast single frequency network to the first group of wireless communication nodes to facilitate distribution to a group of end user devices.

16. The non-transitory machine-readable storage medium of claim 15, wherein the operations further comprise:

identifying a content server according to the first session information;

receiving a unicast stream from the content server; and generating the second media stream from the unicast stream.

17. The non-transitory machine-readable storage medium of claim 15, wherein the operations further comprise:

determining, from the operational states of the media gateway devices, a recovery of operational performance of the first media gateway device;

directing the first media gateway device to resume the first communicative couplings to the first group of wireless communication nodes for resumption of transmission of the first media stream over the multicast-broadcast single frequency network to the first group of wireless communication nodes; and terminating the transmitting of the second media stream to the first group of wireless communication nodes responsive to the resumption of transmission of the first media stream by the first media device.

18. The non-transitory machine-readable storage medium of claim 15, wherein the operations further comprise:
- transmitting an operational state to the media gateway device for indicating a second reduced operational performance; and
- receiving a directive from the media gateway device to interrupt the transmitting of the second media stream to the first group of wireless communication nodes responsive to the indicating of the second reduced operational performance, wherein the first media gateway device resumes the first communication couplings to the first group of wireless communication nodes for resumption of transmission of the first media stream over the multicast-broadcast single frequency network.

19. The non-transitory machine-readable storage medium of claim 15, wherein the first session information comprises bearer path contexts and a multicast group internet protocol address associated with transmission of the first media stream to the first group of wireless communication nodes over the multicast-broadcast single frequency network, and wherein content of the first media stream and the second media stream is the same.

20. A method, comprising:
- receiving, by a processing system including a processor, session information from media gateway devices, wherein the session information is associated with communicative couplings between media gateway devices and wireless communication nodes;
- detecting, by the processing system, a failure of a first media gateway device that provides for transmission of media streams to a first group of wireless communication nodes over a multicast-broadcast single frequency network;
- responsive to detection of the failure of the first media gateway device, substituting for the first media gateway device by:
  - accessing, from the session information, by the processing system, first session information associated with first communicative couplings of the first media gateway device;
  - initiating, by the processing system, second communicative couplings to the first group of communicative nodes according to the first session information;
  - receiving, by the processing system, a unicast stream from a content server that is identified according to the first session information;
  - generating, by the processing system, a second multicast stream from the unicast stream; and
  - transmitting, by the processing system, the second multicast stream over the multicast-broadcast single frequency network to the first group of wireless communication nodes to enable distribution to a group of end user devices.

* * * * *